United States Patent [19]

Peterson

[11] Patent Number: 5,065,802

[45] Date of Patent: Nov. 19, 1991

[54] DADO LATHE

[76] Inventor: Kenneth D. Peterson, 1001 W. Euclid, Indianola, Iowa 50125

[21] Appl. No.: 584,205

[22] Filed: Sep. 18, 1990

[51] Int. Cl.⁵ .................. B27C 5/00; B27C 7/00; B23B 3/28

[52] U.S. Cl. .................. 144/2 R; 142/1; 142/26; 142/33; 142/47; 144/198 A; 144/365

[58] Field of Search ............. 142/1, 11, 26, 33, 34, 142/37, 40, 41, 47, 53; 144/2 R, 48, 138, 198 A, 205, 206, 365

[56] References Cited

U.S. PATENT DOCUMENTS

| 121,417 | 11/1871 | Pries et al. ................ 142/33 |
|---|---|---|
| 352,901 | 11/1886 | Wood ....................... 142/33 |
| 431,525 | 7/1890 | Mattison ................... 142/41 X |
| 493,038 | 3/1893 | Milburn . |
| 507,619 | 10/1893 | Holmstrom ................ 142/33 |
| 2,053,523 | 9/1936 | Gurrieri et al. ............. 142/26 |
| 2,818,896 | 1/1958 | Bailey ........................ 142/1 X |
| 2,847,044 | 8/1958 | Anderson .................. 143/171 |
| 3,362,444 | 1/1968 | Pesola et al. ............... 142/40 |
| 3,556,176 | 1/1971 | Harding ..................... 142/11 |
| 4,227,557 | 10/1980 | Allen .......................... 142/7 |
| 4,275,777 | 6/1981 | Briggs ........................ 144/138 |
| 4,527,602 | 7/1985 | Martin ....................... 142/55 |
| 4,627,772 | 12/1986 | Petersen ..................... 409/121 |
| 4,899,795 | 2/1990 | Hackett ...................... 144/2 R X |

FOREIGN PATENT DOCUMENTS

8748 of 1898 United Kingdom ............. 142/40

*Primary Examiner*—Steven C. Bishop
*Attorney, Agent, or Firm*—Zarley, McKee, Thomte, Voorhees, & Sease

[57] ABSTRACT

A dado lathe is provided for use with a table saw in performing numerous cutting operations on a piece of wood stock. The dado lathe device includes a pair of parallel, spaced apart guide rails upon which a frame is slidably mounted. The frame includes vertically and longitudinally adjustable headstock and tailstock spindles for rotatably supporting the wood stock. A drive system selectively rotates the wood stock while moving the frame longitudinally along the guide rails. Using the dado lathe device, a square wood stock can be turned to a round wood stock, spiral and grooves can be cut in the wood stock, the wood stock can be tapered, and beading and reeding can be cut along the length of the wood stock.

22 Claims, 8 Drawing Sheets

DADO LATHE

Many different types of tools and machines are utilized in woodworking, with each generally having specific uses for particular types of work. For example, table saws are utilized for cutting the wood stock as it moves in a direction perpendicular to the blade axis. Thus, a table saw can cut a wood stock to length, cut dados with a dado blade or cut decorative molding with a molding head. Another example is a lathe, which generally utilizes a stationary cutting tool to cut rotating stock. Thus, square stock can be turned to round stock having differing dimensions along its length.

Since each machine has limited uses, a plurality of different machines are normally required to have a complete woodworking shop. These limitations include the type of cut performed by the machine as well as the type and size of stock which can be cut by the machine. For example, a lathe cannot cut unbalanced pieces of wood stock, since the high rotational speed of the stock causes wobbling when the stock is unbalanced. Also, the lathe cannot readily accommodate small diameter sized stock, since the small dimension will produce whip as the stock rotates at a high speed. Also, a lathe often requires numerous passes along the length of the stock to produce the desired finished cut.

Therefore, a primary objective of the present invention is the provision of a woodworking device which allows lathe-type work to be performed on a table saw.

Another objective of the present invention is the provision of a dado lathe device which permits square stock to be turned to round stock using a dado blade on a table saw.

A further objective of the present invention is the provision of a dado lathe woodworking device which accommodates small, large, and unbalanced stock.

A further objective of the present invention is the provision of a dado lathe woodworking device which cuts the stock in a single pass.

Still another objective of the present invention is the provision of a dado lathe woodworking device which can be used for tapering a wood stock, and can be used for cutting spirals, grooves, beading, and reeding in the stock.

Yet a further objective of the present invention is the provision of a woodworking device which is economical to manufacture, and durable and safe in use.

These and other objectives will become apparent from the following description of the invention.

SUMMARY OF THE INVENTION

The dado lathe woodworking device of the present invention is mounted upon a table saw having a rotating arbor with a dado blade or molding head. More particularly, the device includes a pair of parallel, spaced apart guide rails which are secured to the table saw at an angle with respect to the blade. An elongated frame is mounted on the guide rails for movement along the rails.

Headstock and tailstock spindles are provided on the frame for rotatably holding the piece of wood stock. The space between the spindles is adjustable, as is the relative height of one spindle with respect to the other spindle.

A gear assembly is provided on one end of the frame so as to rotate the wood stock while simultaneously moving the frame and stock longitudinally along the rails. The gear assembly includes a plurality of gears which are driven by hand crank. The gears can be changed such that the extent of longitudinal travel of the frame and stock relative to the rotation of the stock can be varied. Also, gears can be disengaged such that the stock can be rotated without longitudinal movement, or moved longitudinally without rotation.

In order to turn a square stock into a round stock, the hand crank is turned so as to rotate the stock while moving the frame and stock longitudinally across the path of the rotating blade. The angle of the rails and frame relative to the blade is set such that the cut of the blade slightly overlaps on each revolution of the stock. In order to cut a spiral into the stock, the longitudinal travel of the stock relative to the rotation of the stock is increased such that the cut of the blade is not overlapped on each revolution of the stock. The blade can taper the stock by raising the headstock or tailstock spindle relative to the other spindle. Grooves can be cut around the perimeter of the stock by positioning the rails and frame perpendicular to the blade face and disengaging the gears to prevent longitudinal travel of the frame as the stock rotates. Also, beading and reeding can be cut along the length of the stock by positioning the rails and frame parallel to the blade face and moving the frame longitudinally without rotating the stock.

Thus, many lathe functions can be safely performed on the table saw.

DETAILED DESCRIPTION OF THE DRAWINGS

Figure 1:
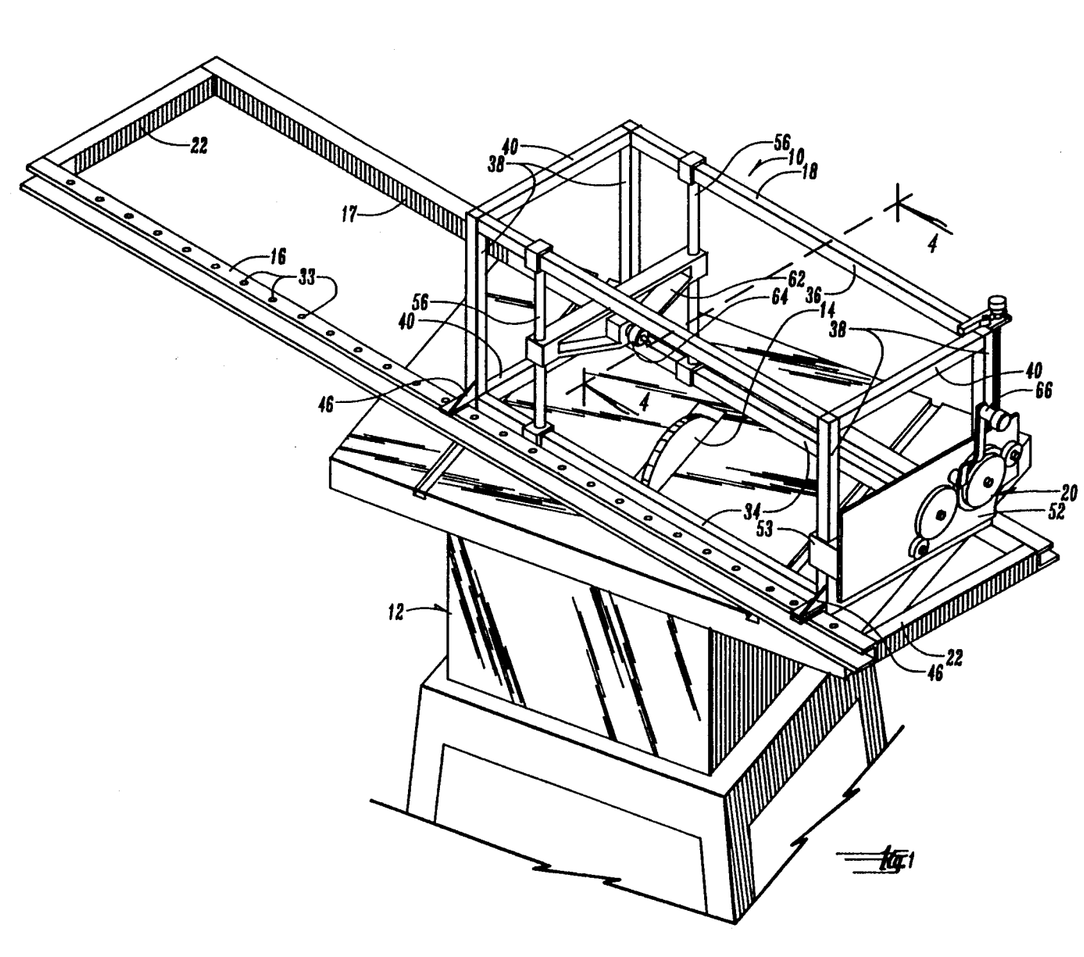
FIG. 1 is a perspective view of the dado lathe device of the present invention, in conjunction with a table saw.

The dado lathe woodworking device of the present invention is generally designated by the reference numeral 10 in the drawings. As seen in FIG. 1, the dado lathe 10 is used in conjunction with a table saw 12 having a rotating arbor (not shown). The arbor can hold a C-saw blade, a dado blade, or a molding head, generally designated by the reference numeral 14.

Figure 4:
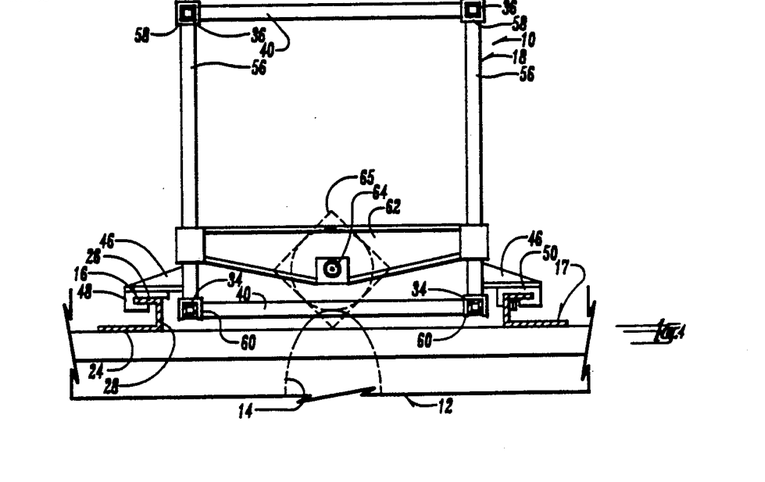
FIG. 4 is a sectional view taken along lines 4—4 of FIG. 1.
Figure 5:
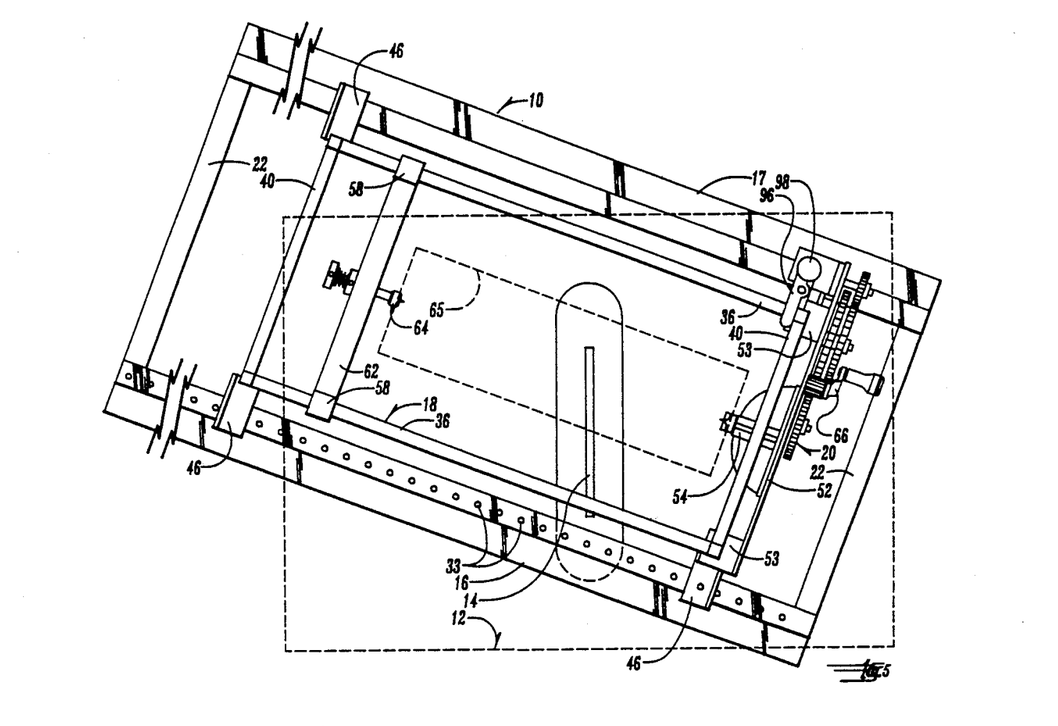
FIG. 5 is a top plan view of the device.
Figure 6:
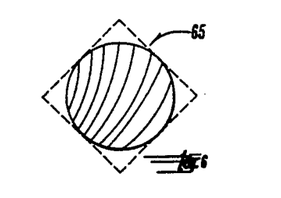
FIG. 6 is an end view of a square wood stock cut to a round wood stock by the device.
Figure 8:
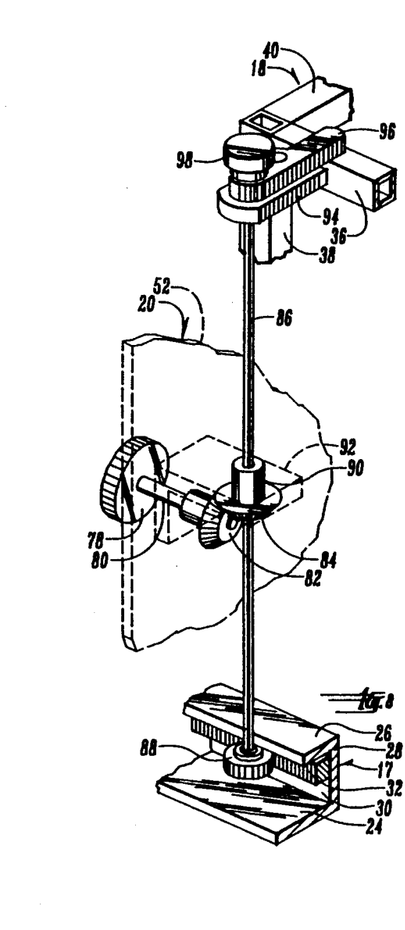
FIG. 8 is a partial perspective view showing the gear assembly for moving the frame relative to the saw blade.

Dado lathe 10 generally consists of a pair of parallel, spaced apart guide rails 16, 17 an elongated frame 18, and a drive system 20. Guide rails 16, 17 are connected at their opposite ends by cross arms 22. Arms 22 can be releasably fastened to rails 16, 17 in any conventional manner. As best seen in FIG. 4, guide rails 16, 17 are substantially C-shaped in cross section. Each rail has a lower leg 24, an upper leg 26, and an inner connecting upright member 28 so as to define a channel 30 extending along the length of each rail. Rails 16, 17 are releasably secured to the table saw 12 in any convenient manner, such as by C clamps (not shown). Guide rail 17 also has a rack having a row of track teeth 32, as best seen in FIG. 8. Rail 16 includes a plurality of equally spaced holes 33 along upper leg 26.

Figure 23:
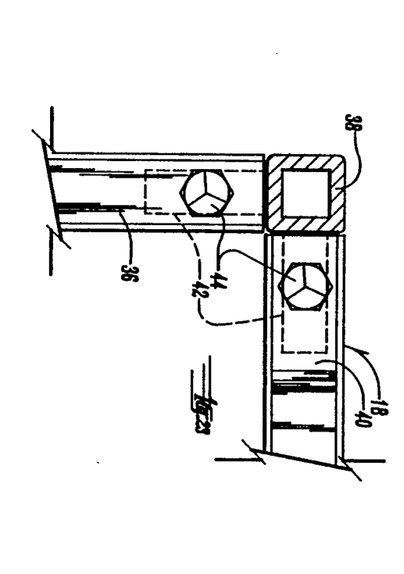
FIG. 23 is a partial top view of an upper corner of the frame of the device.
Figure 24:
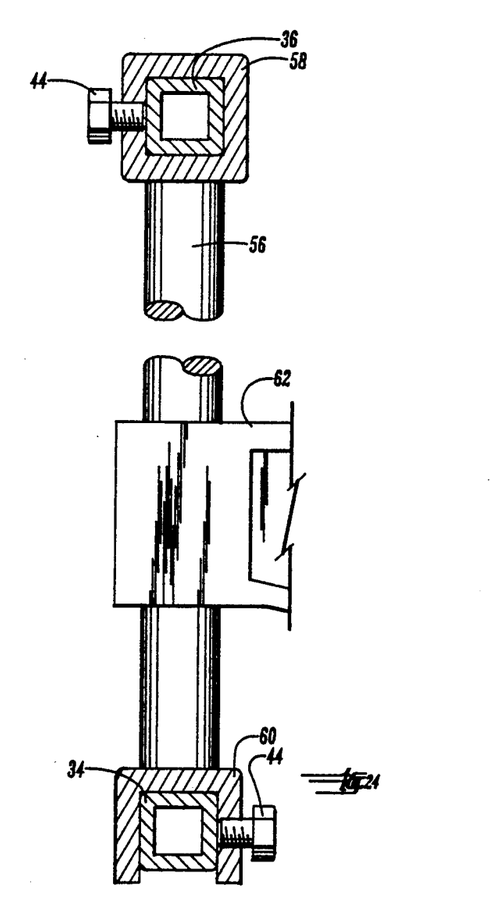
FIG. 24 is a partial sectional view taken along lines 24—24 of FIG. 2.

Frame 18 includes a pair of spaced apart, horizontally disposed lower members 34, and a pair of spaced apart, horizontally disposed upper members 36. A pair of vertically disposed members interconnect the lower and upper members 34, 36 on each side of frame 18. Upper and lower cross arms 40 interconnect the members 34, 36 and 38 at each end of the frame. As seen in FIG. 23, each upright member 38 includes a pair of male extensions 42 extending at right angles to one another for receipt in the hollow ends of upper member 36 and cross arm 40, and are releasably secured by a bolt or set screw 44. A similar construction is utilized for the lower corners of frame 18. This construction of frame 18, including the releasable frame members 34, 36, 38 and 40 allows the dado lathe to be easily shipped in a disassembled state.

Figure 3:
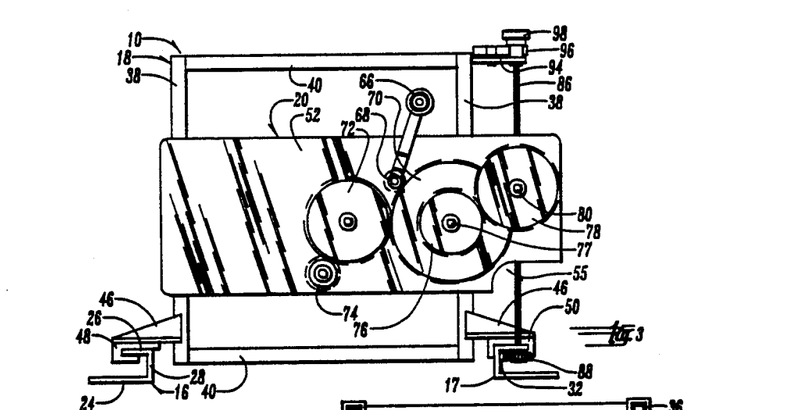
FIG. 3 is a view from one end of the device.

Frame 18 is positioned on guide rails 16, 17 for sliding movement along the rails. Each of the lower corners of the frame includes an outwardly projecting flange 46 for supporting the frame on the rails. Each flange 46 includes a sliding member for interlocking with the associated guide rail 16, 17. The slide member is made of a low-friction, yet durable material, such as Teflon brand material. More particularly, a slide member 48 has a C-shaped cross section with a groove for receiving the upper leg 26 of rail 16, as best seen in FIGS. 3 and 4. A slide member 50 on the opposite side of frame 18 is box-shaped with a groove therein for receiving the upper leg 26 of guide rail 17 and an opening in the lower portion for receiving the upright member 28 and row of teeth 32 of rail 17. Thus, slide members 48 and 50 cooperate to prevent lateral and vertical movement of frame 18 with respect to guide rails 16, 17.

Frame 18 includes a head plate 52, which is slidably mounted by brackets 53 upon vertical members 38 of the frame at the upstream end of the frame. Head plate 52 is slidable along vertical members 38 and is held at a selected height by set screws (not shown) or the like. The lower right corner of head plate 52 includes a notch or recess 55, as best in FIG. 3, such that as the head plate is lowered, the lower portion of head plate 52 will fit between guide rails 16, 17. A headstock 54 is rotatably mounted on head plate 52 so as to extend towards the interior of frame 18. Headstock 54 is positioned at the lower edge of head plate 52 such that the headstock can be lowered substantially to the surface of table saw 12.

Frame 18 also includes a pair of slidable upright arms 56. More particularly, as best seen in FIGS. 1 and 4, arms 56 include an upper collar 58 slidably mounted upon upper members 36 of the frame, and lower C-shaped collars 60 slidably mounted upon lower members 34 of the frame. A cross member 62 is slidably mounted on arms 56 and is held at a selected height by set screws (not shown) or the like. Cross member 62 rotatably supports a tailstock 64. The lower edge of cross member 62 is V-shaped such that tailstock 64 can be lowered substantially to the surface of the table saw 12.

Headstock 54 and tailstock 64 are adapted to rotatably support a piece of wood stock 65. The spacing between headstock 54 and tailstock 64 can be increased or decreased to accommodate various length stock by sliding arms 56 along frame members 34, 36. Also, the height of the ends of the wood stock can be adjusted by raising or lowering head plate 52 and/or cross member 62, so as to accommodate large or small diameter stock and so as to permit tapered cutting of the stock, as described below.

The drive system 20 of dado lathe 10 is capable of rotating the stock and moving frame 18 longitudinally along guide rails 16, 17. More particularly, a hand crank 66 is rotatably mounted upon head plate 52. A first gear 68 is operatively connected to crank 66 and includes teeth which mesh with the teeth of a second gear 70, which in turn mesh with the teeth of a third gear 72. A fourth gear 74 is operatively connected to the axle of headstock 54 and has teeth which mesh with the teeth of third gear 72. A fifth gear 76 is releasably mounted upon the axle 77 of second gear 70 for rotation with gear 70, and includes teeth which mesh with a sixth gear 78 releasably mounted upon an axle 80.

Axle 80 extends through head plate 52 and has a first bevel gear 82 mounted on the end thereof opposite sixth gear 78. The teeth of bevel gear 82 mesh with the teeth of a second bevel gear 84 which is slidably mounted upon a square axle 86. The lower end of axle 86 has a seventh gear 88 mounted thereon for meshing engagement with the teeth 32 in channel 30 of guide rail 17. Bevel gear 84 includes a hub 90 which is rotatably journaled within a support bracket 92 connected to head plate 52.

Figure 22:
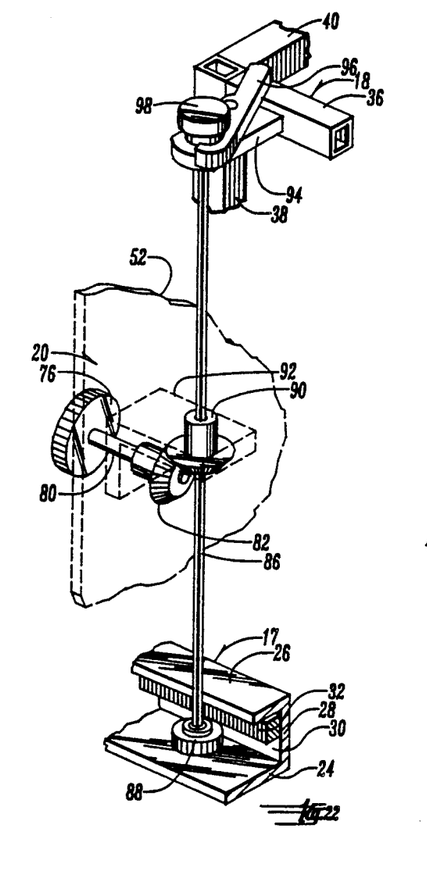
FIG. 22 is a perspective view similar to FIG. 8, showing the gear assembly disengaged.

The upper end of axle 86 slidably extends through a support arm 94 extending from the adjacent upper member 36 of frame 18. A spacer bar 96 is pivotally mounted upon support arm 94 so as to normally fit between support arm 94 and a knob 98 on the upper end of axle 86. Preferably, bar 96 is spring mounted so as to be normally urged to the position between arm 94 and knob 98. When bar 96 is pivoted such that the end disengages from knob 98, axle 86 is free to slide downwardly until knob 98 engages support arm 94, as shown in FIG. 22, whereby the lower gear 88 disengages from the track teeth 32 of guide rail 17. Support bracket 92 prevents bevel gear 84 from moving upwardly when axle 86 is raised to re-engage the teeth of gear 88 with track teeth 32.

Figure 2:
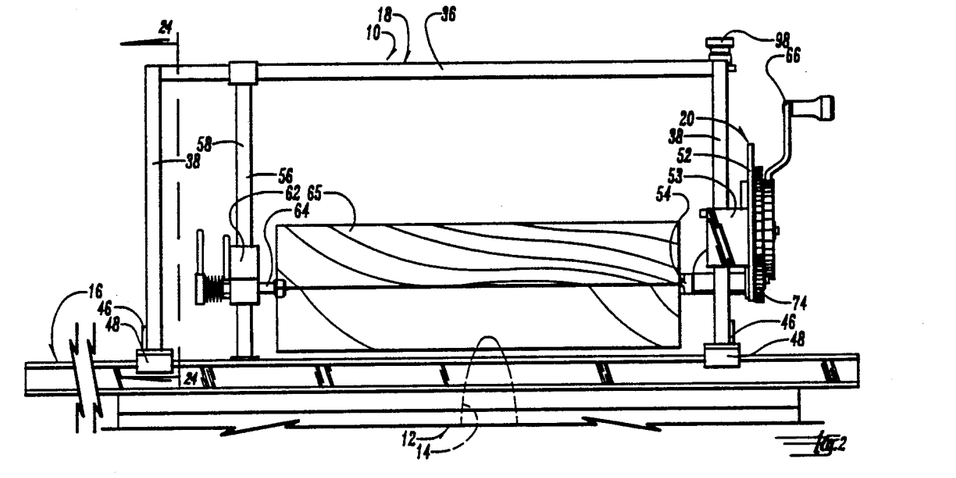
FIG. 2 is a side elevation view of the device.
Figure 7:
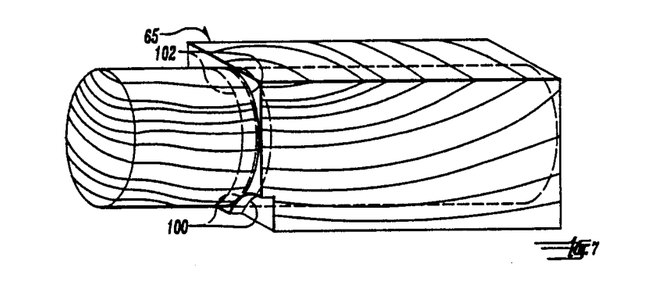
FIG. 7 is a perspective view showing the overlapping cut of the dado blade in turning a square wood stock to a round wood stock.

The dado lathe device of the present invention can be used in several different manners for cutting a piece of wood stock 65. One of the main uses of the dado lathe is to turn square stock into round stock in a single pass of the stock across the blade 14, as seen in FIGS. 2-7. To cut a round stock from a square stock, rails 16, 17 are clamped to table saw 12 so as to be angularly disposed with respect to the blade face. The angle will vary depending on the diameter of the stock, but must be sufficient such that the cut 100 of blade 14 on each revolution of the stock overlaps the preceding cut 102, as shown in FIG. 7. Preferably, the overlap is approximately 1/16". The square stock 65 is mounted between headstock 54 and tailstock 64. The height of the headstock and the tailstock is adjusted such that the longitudinal axis of the wood stock 65 is horizontally disposed, as shown in FIG. 2. Frame 18 is moved to the right end of guide rails 16, 17, as seen in FIG. 1, such that the tail end of the wood stock is spaced slightly from blade 14. With the axle 86 in the raised position, as seen in FIG. 8, hand crank 66 is rotated, thereby turning gears 68-78, bevel gears 82, 84, and gear 88. Through the intermeshing of the gear teeth, headstock 54, and thus the wood stock 65 is rotated about its longitudinal axis while frame 18 is simultaneously moved longitudinally along guide rails 16, 17 such that the blade 14 cuts the wood stock 65. Preferably, the gear ratios are such that the frame travels approximately ¾ inch for each revolution of the wood stock 65. Blade 14 utilizes a dado blade cutting the square stock into a round lathe blank.

Figure 9:
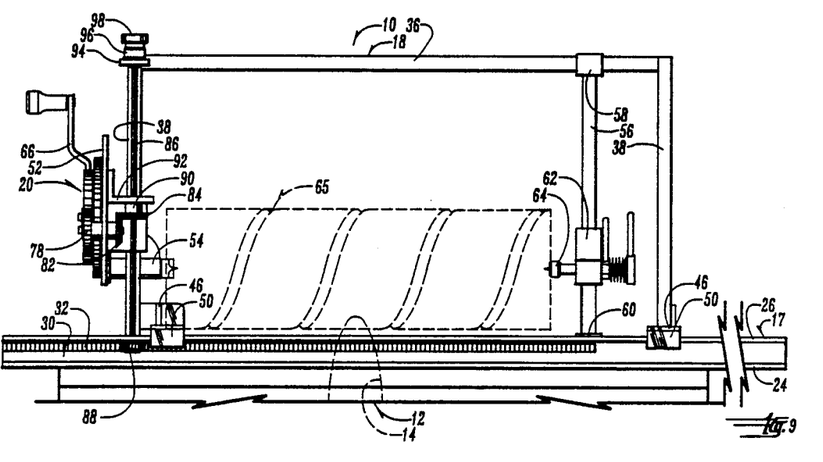
FIG. 9 is a side elevation view of the device as used to cut a spiral along the length of a wood stock.
Figure 10:
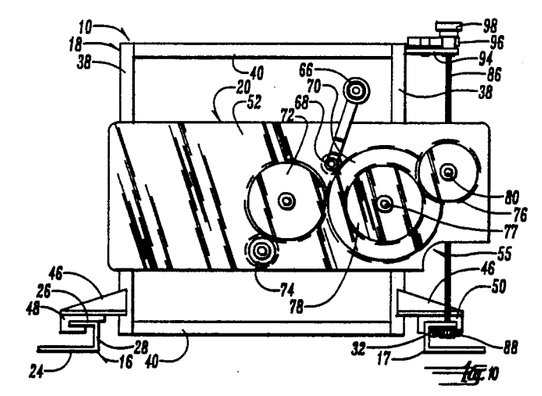
FIG. 10 is an end view showing the gear assembly arranged for cutting a spiral.
Figure 11:
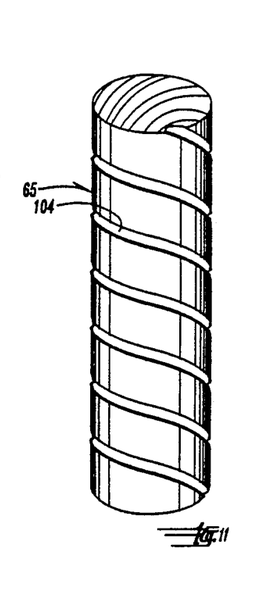
FIG. 11 is a perspective view of the stock with a spiral cut therein.

A second use of the dado lathe device 10 is to cut spirals into the wood stock, as seen in FIGS. 9-11. These spiral cuts 104 are accomplished in the same manner as described above for producing a round stock, except that gears 76 and 78 are exchanged on axles 77 and 80. This reversal of gears 76 and 78 causes gear 88 to travel further along track teeth 32 for each revolution of hand crank 66. Accordingly, frame 18 travels longitudinally further on each revolution of the wood stock, as compared to the set up described previously. This reversal of the gears is shown in FIG. 10. With this reversal of gears, the frame 18 travels approximately 2.5 inches for each revolution of the stock. Gears having different sizes may be substituted for gears 76 and/or 78 so as to vary the pitch of the spiral in accordance with the linear travel of the frame per revolution of the stock. Blade 14 may utilize either a dado blade or a molding head for cutting decorative spirals 104 in the wood stock.

Figure 12:
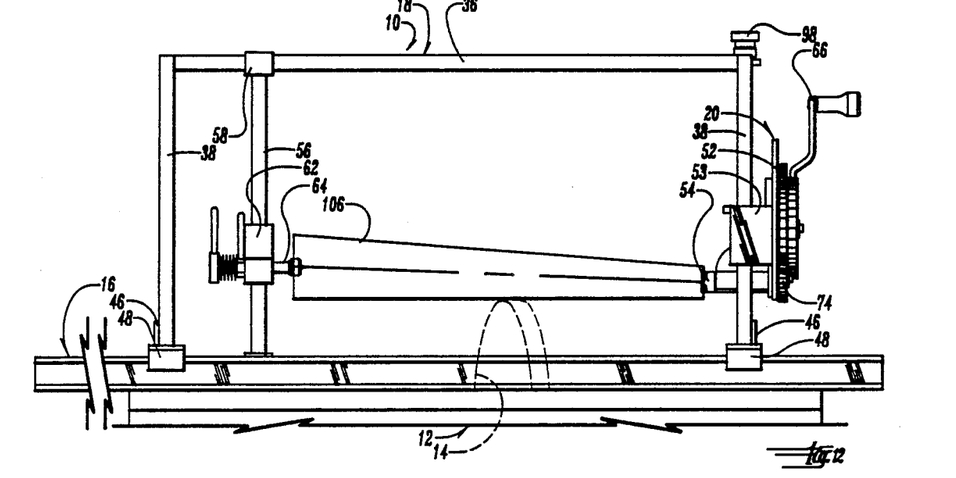
FIG. 12 is a side elevation view of the device as used to cut a tapered stock.
Figure 13:
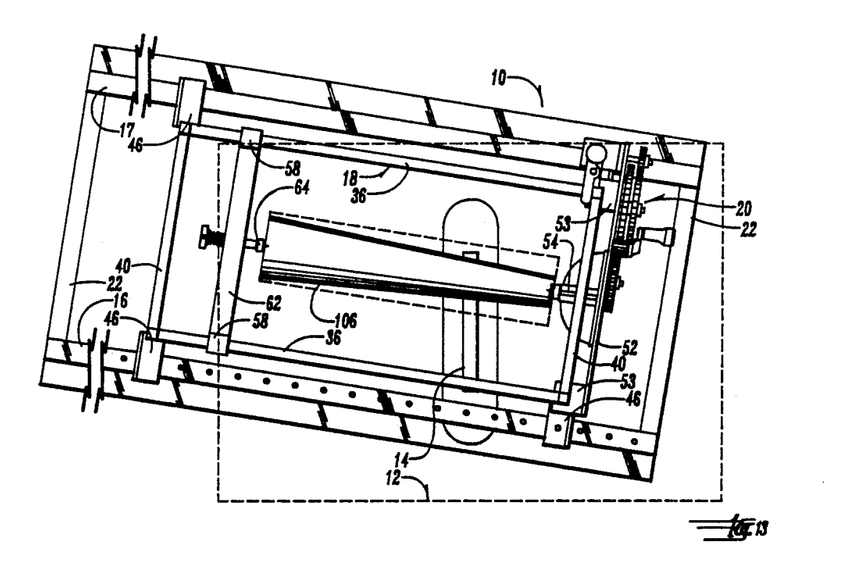
FIG. 13 is a top plan view of the device as used for tapering the stock.
Figure 14:
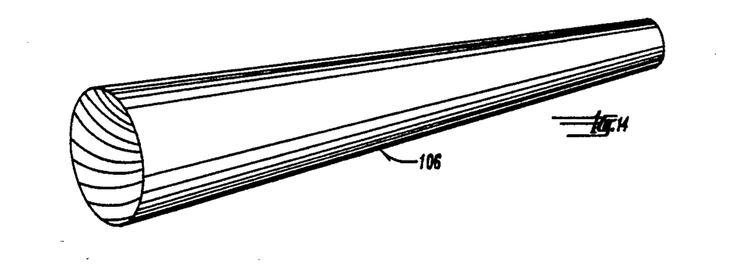
FIG. 14 is a perspective view of the tapered stock.

A third use of the dado lathe device 10 is to produce a round stock which is tapered from one end to the other, as seen in FIGS. 12-14. This tapered stock 106 is produced by using the same procedure described above for producing a round stock, except that either the headstock 54 or tailstock 64 is raised or lowered so that the longitudinal axis of the wood stock is inclined. Thus, the blade 14 will cut more from the lower end of the wood stock than from the raised end, thereby producing the round, tapered piece 106.

Figure 15:
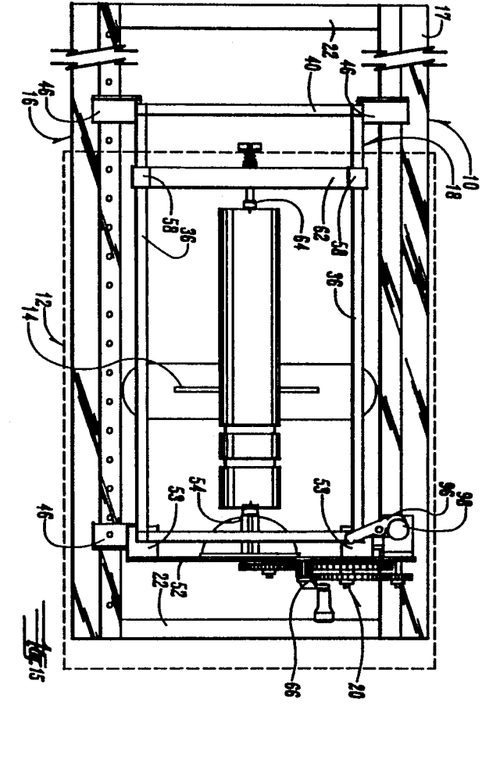
FIG. 15 is a top plan view of the device as used for cutting grooves in a wood stock.
Figure 16:
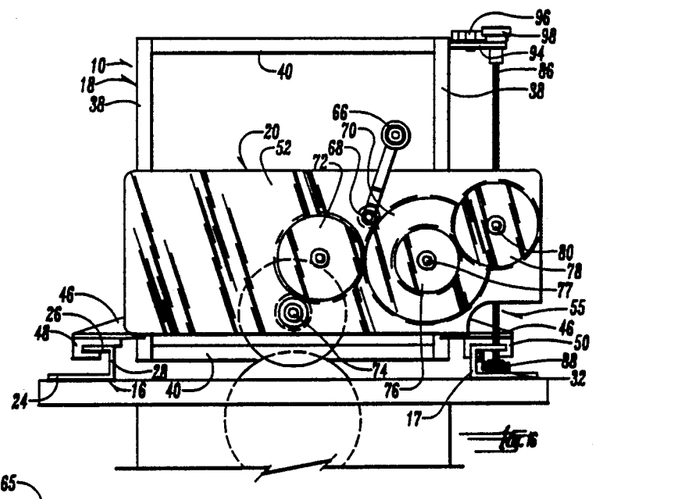
FIG. 16 is an end view showing the device as based for cutting grooves.
Figure 17:
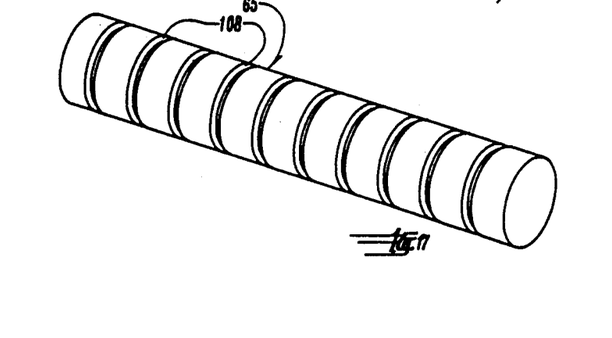
FIG. 17 is a perspective view of a wood stock having a plurality of grooves cut therein.
Figure 18:
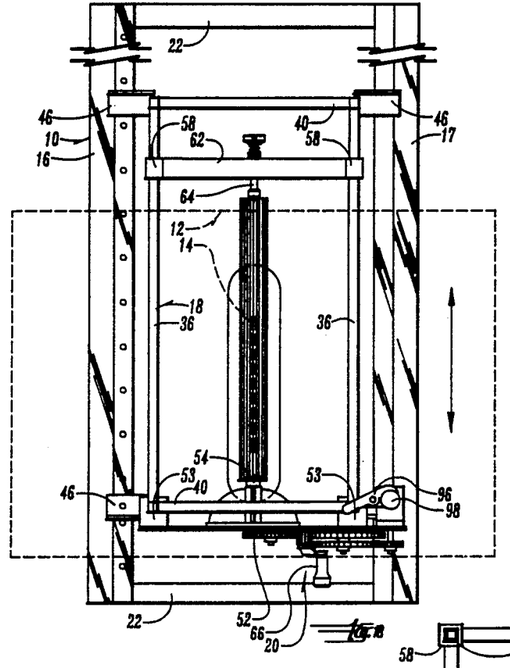
FIG. 18 is a top plan view showing the device as used for cutting beading or reeding in the stock.
Figures 19, 21:
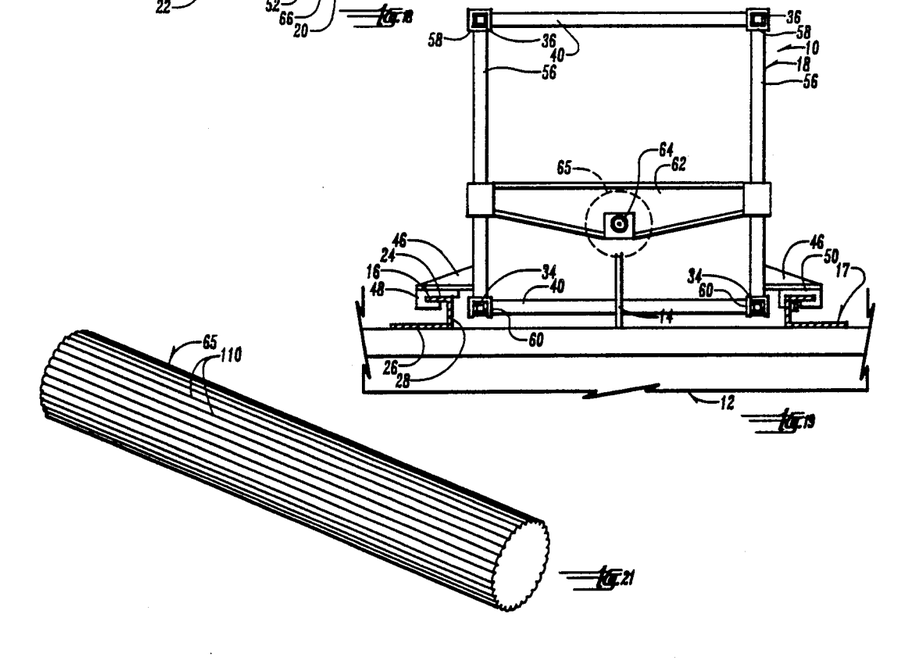
FIG. 19 is a sectional view of the device as used for cutting beading and reeding in the stock.
FIG. 21 is a perspective view of a beaded stock.
Figure 20:
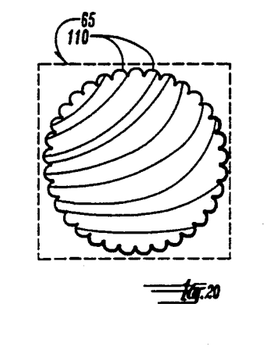
FIG. 20 is an end view of a beaded stock.

Still another function of the dado lathe device of the present invention is to cut perimeter grooves 108 in the wood stock, shown in FIGS. 15-17. In order to cut grooves, rails 16, 17 are positioned so as to be perpendicular to the face of blade 14. Gear 88 is disengaged from track teeth 32 by pivoting spacer bar 94 out of engagement with knob 98 and sliding axle 86 downwardly, as shown in FIG. 22. Frame 18 is then free to slide along rails 16, 17 so that a groove may be cut at the desired location in the wood stock. After positioning the wood stock 65, frame 18 is locked in place on the guide rails by a pin (not shown) extending through a hole in one of flanges 46 and into one of a plurality of equally spaced holes 33 in guide rail 16. Hand crank 66 is then turned so as to rotate the wood stock such that blade 14 cuts a groove 108 in the perimeter of the woo stock. The depth of the groove is controlled by the height of headstock 54 and tailstock 64 and by raising or lowering the blade or molding head 14. Additional grooves can be cut in the wood stock by removing the locking pin from the hole 33 in rail 16 and sliding the frame 18 along the rails to the next desired position. Blade 14 may use either a dado blade or a molding head for cutting decorative grooves 108 in the wood stock.

Still another function of the dado lathe of the present invention is for cutting longitudinal beading or reeding along the wood stock, as shown in FIGS. 18-21. In order to cut beading 110 or reeding (not shown) using a molding head on blade 14, rails 16, 18 are positioned parallel with the face of blade 14. In cutting the beading or reeding, frame 18 is moved along the rails without rotation of the wood stock. In order to keep the stock from rotating, gear 88 is disengaged from track teeth 32, as described above and as shown at FIG. 22. Frame 18 can then be manually pushed along the rails without turning hand crank 66. Alternatively, gear 88 can be in meshing engagement with track teeth 32, and gear 72 removed from head plate 52 such that upon rotation of hand crank 66, frame 18 will travel along the rails without rotation of gear 74, headstock 54, and the wood stock. After each cut of beading 110 or reeding, the wood stock is rotated using any well known indexing method, such as with a pin on one of the gears, such as the number of teeth on one of the gears, such that a plurality of beading or reeding can be cut around the perimeter of the wood stock.

From the foregoing, it can be seen that a versatile dado lathe is provided which is useful in many different types of cutting operations on a piece of wood stock. The device relies upon the high rotational speed of the blade for cutting the wood stock, as compared to a lathe which relies upon the high rotational speed of the stock for cutting by a fixed cutting tool. Also, with the dado lathe device 10, the operator's hands are not in close proximity to the stock or blade as the stock is cut, in contrast to a lathe wherein the operator is normally holding the cutting tool adjacent the rotating stock. Therefore, the device is very safe. Also, the cutting action produced by the dado lathe can be easily duplicated on successive pieces of stock. Thus, the present invention accomplishes at least all of the stated objectives.

What is claimed is:

1. In combination with a table saw having a rotating dado blade with a perimeter cutting edge, a device for turning an elongated wood stock having a longitudinal axis from a square cross section to a round cross section, the device comprising:

a pair of spaced apart rails mounted on the table saw at an oblique angle with respect to the blade;

a frame mounted on the rails for movement along the rails, and having opposite ends and opposite sides;

stock mounting means for rotatably mounting the stock on the frame such that the stock is disposed at an oblique angle to the edge of the blade;

means for rotating the stock about its longitudinal axis; and means for moving the frame along the rails such that the rotating blade produces a helical cut for each revolution of the stock, with adjacent cuts overlapping one another so as to produce a round stock from the square stock.

2. The device of claim 1 further comprising coupling means for selectively coupling the means for rotating the stock and the means for moving the frame whereby the wood stock rotates about its longitudinal axis as the frame moves along the rails, the coupling means rotating the stock at a controlled rate relative to the movement of the frame.

3. The device of claim 2 wherein the stock mounting means includes a headstock spindle and a tailstock spindle both being mounted on the frame and being adapted to retentively engage opposite ends of the wood stock.

4. The device of claim 3 wherein the means for rotating the stock includes a rotator gear operatively connected to the headstock spindle and to a drive means, such that actuation of the drive means rotates the rotator gear which rotates the headstock spindle, and thus the wood stock.

5. The device of claim 4 wherein the drive means comprises a hand crank.

6. The device of claim 4 wherein the means for moving the frame includes a transport gear operatively connected to the frame and to the drive means, and a plurality of gear teeth linearly disposed along one of the rails for meshing engagement with the transport gear, such that actuation of the drive means rotates the transport gear along the gear teeth to move the frame along the rails.

7. The device of claim 6 wherein the coupling means includes a first bevel gear operatively connected to the drive means, a second bevel gear in meshing engagement with the first bevel gear, an elongated shaft slidably extending through the axis of the second bevel gear and having opposite ends, the transport gear being mounted on one end of the shaft.

8. The device of claim 3 further comprising adjustment means for adjusting the vertical position of each spindle relative to one another.

9. The device of claim 3 further comprising adjustment means for adjusting the spacing between the spindles.

10. The device of claim 1 wherein the frame includes a pair of spaced apart lower members, a pair of spaced apart upper members, a first pair of spaced apart upright members at one end of the frame interconnecting the lower and upper members, and a second pair of spaced apart upright members at the opposite end of the frame interconnecting the lower and upper members so as to form an elongated cubical frame structure.

11. The device of claim 10 wherein the stock mounting means includes opposing spindles, one of which is slidably movable along one of the pair of upper and lower members of the frame.

12. The device of claim 1 wherein the frame includes a plurality of slide members extending from each side of the frame for slidably supporting the frame on the rails.

13. The device of claim 3 wherein the coupling means includes gear means for controlling the extent of longitudinal travel of the stock relative to each rotation of the stock.

14. The device of claim 3 further comprising a single drive means for actuating the means for rotating the stock and the means for moving the frame.

15. The device of claim 2 wherein the coupling means includes a plurality of selectively interchangeable gears which allow the rate of rotation relative to longitudinal travel of the frame and stock to be changed, such that upon another pass of the round stock past the blade, a spiral is cut into the round stock.

16. A method of turning a wood stock from a square cross section to a round cross section using a table saw having a rotating dado blade with a perimeter cutting edge, comprising;

securing a pair of spaced apart guide rails to the table saw at an oblique angle with respect to the blade, the rails having an elongated frame slidably mounted thereon for movement along the rails;

mounting the stock on the frame so that the stock is obliquely angled with respect to the edge of the blade and so that a portion of the stock resides in a plane below the perimeter edge of the blade;

rotating the stock about its longitudinal axis; and continuously having the frame and stock in a direction parallel to the longitudinal axis of the stock such that the rotating blade produces a helical cut for each revolution of the stock, with adjacent cuts overlapping one another.

17. The method of claim 16 wherein a stock initially having a square cross section is cut to a stock having a round cross section upon a single pass of the stock across the blade.

18. The method of claim 16 further comprising elevating one end of the stock relative to the opposite end of the stock such that upon completion of the cutting, the stock is tapered along its length.

19. The method of claim 16 further comprising continuously moving the frame and round stock past the blade for a second cutting such that each revolution of the moving round stock produces a cut which is spaced from the cut on the preceding adjacent revolution such that the round stock has a spiral cut therein.

20. The method of claim 16 further comprising positioning the frame such that the round stock is perpendicular to the blade, and intermittently moving the frame and round stock for cutting by the blade such that a plurality of grooves are cut in the rotating stock by the blade.

21. The method of claim 19 wherein the dado blade is replaced with a molding head.

22. The method of claim 20 wherein the dado blade is replaced with a molding head.

* * * * *